(12) United States Patent
Bolshakov et al.

(10) Patent No.: US 7,681,450 B2
(45) Date of Patent: Mar. 23, 2010

(54) CASING RESONANT RADIAL FLEXURAL MODES IN CEMENT BOND EVALUATION

(75) Inventors: Alexei Bolshakov, Pearland, TX (US); Vladimir Dubinsky, Houston, TX (US); Xiao Ming Tang, Sugar Land, TX (US); Douglas J. Patterson, Spring, TX (US); Dimitri Donskoy, Hoboken, NJ (US); Joseph Gregory Barolak, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 200 days.

(21) Appl. No.: 11/634,771

(22) Filed: Dec. 6, 2006

(65) Prior Publication Data
US 2007/0131417 A1    Jun. 14, 2007

Related U.S. Application Data

(60) Provisional application No. 60/749,136, filed on Dec. 9, 2005.

(51) Int. Cl.
*G01N 29/12* (2006.01)
*G01V 1/40* (2006.01)
*G01V 1/00* (2006.01)

(52) U.S. Cl. .................. 73/582; 73/152.54; 367/35; 181/102; 181/105

(58) Field of Classification Search ............ 73/582, 73/622, 625, 152.01, 152.02, 152.28, 152.57; 367/25, 35; 702/11; 181/102, 105; 166/250.01, 166/250.08
See application file for complete search history.

(56) References Cited

U.S. PATENT DOCUMENTS

| | | | | |
|---|---|---|---|---|
| 4,131,875 A | * | 12/1978 | Ingram | 367/35 |
| 4,255,798 A | * | 3/1981 | Havira | 367/35 |
| 5,001,676 A | * | 3/1991 | Broding | 367/31 |
| 5,798,981 A | * | 8/1998 | Littlejohn et al. | 367/13 |
| 5,907,131 A | | 5/1999 | Tello | |
| 6,483,777 B1 | | 11/2002 | Zerong | |
| 6,693,554 B2 | * | 2/2004 | Beique et al. | 340/856.3 |

(Continued)

FOREIGN PATENT DOCUMENTS

EP    1 505 252 B1    9/2005

OTHER PUBLICATIONS

Smaine Zeroug and Benoit Froelich, Ultrasonic Leaky-Lamb Wave Imaging Through a Highly Contrasting Layer, 2003 IEEE Ultrasonics Symposium, pp. 794-798.

*Primary Examiner*—J M Saint Surin
(74) *Attorney, Agent, or Firm*—Bracewell & Giuliani LLP

(57) ABSTRACT

A method useful for evaluating the presence and/or the quality of the cement bond of a downhole tubular. The method involves measuring radial resonance modes of the tubular, and comparing those measured values to the unbound tubular resonant values of a calibration ring. For a well bonded tubular, the measured radial resonance should be greater than that of the unbound tubular calibration ring. In regions where a fluid, such as water surrounds the outside of the tubular, or the cement is otherwise not bonded to the outer surface of the tubular, the measured response should be less than the calibrated response. The calibration ring should have the same diameter, wall thickness, and be made of the same material as the tubular.

8 Claims, 6 Drawing Sheets

U.S. PATENT DOCUMENTS

| | | |
|---|---|---|
| 6,850,462 B2 * | 2/2005 | McDaniel et al. ............. 367/35 |
| 7,149,146 B2 * | 12/2006 | Kuijk et al. .................... 367/35 |
| 7,210,343 B2 * | 5/2007 | Shammai et al. ......... 73/152.28 |
| 7,258,167 B2 * | 8/2007 | Shammai et al. ............. 166/264 |
| 7,398,159 B2 * | 7/2008 | Venkataramanan et al. ... 702/11 |
| 7,414,918 B2 * | 8/2008 | Hurst et al. .................... 367/35 |
| 2005/0190648 A1 * | 9/2005 | Tang et al. ..................... 367/35 |
| 2008/0112262 A1 * | 5/2008 | Tang et al. ..................... 367/35 |

\* cited by examiner

CASING RESONANT RADIAL FLEXURAL MODES IN CEMENT BOND EVALUATION

RELATED APPLICATIONS

This application claims priority from co-pending U.S. Provisional Application No. 60/749,136, filed Dec. 9, 2005, the full disclosure of which is hereby incorporated by reference herein.

BACKGROUND OF THE INVENTION

1. Field of the Invention

The invention relates generally to the field of the evaluation of wellbore casing. More specifically, the present invention relates to a method and apparatus to provide for the analysis of the bond that secures casing within a wellbore.

2. Description of Related Art

Hydrocarbon producing wellbores typically comprise tubulars, such as casing 8, set within the wellbore 5. Typically the casing 8 is bonded to the wellbore by adding cement 9 within an annulus formed between the outer diameter of the casing 8 and the inner diameter of the wellbore 5. The cement bond not only adheres the casing 8 within the wellbore 5, but also serves to isolate adjacent zones (Z1 and Z2) within the formation 18 from one another. Isolating adjacent zones can be important when one of the zones contains oil or gas and the other zone includes a non-hydrocarbon fluid such as water. Should the cement 9 surrounding the casing 8 be defective and fail to provide isolation of the adjacent zones, water or other undesirable fluid can migrate into the hydrocarbon-producing zone thus diluting or contaminating the hydrocarbons within the producing zone.

To detect possible defective cement bonds, downhole tools 14 have been developed for analyzing the integrity of the cement 9 bonding the casing 8 to the wellbore 5. These downhole tools 14 are lowered into the wellbore 5 by wireline 10 in combination with a pulley 12 and typically include transducers 16 disposed on their outer surface formed for acoustic coupling to the fluid in the borehole. These transducers 16 are generally capable of emitting acoustic waves into the casing 8 and recording the amplitude of the acoustic waves as they travel, or propagate, across the surface of the casing 8. Characteristics of the cement bond, such as its efficacy and integrity, can be determined by analyzing the attenuation of the acoustic wave.

One example of such an acoustic transducer is a piezoelectric device having a piezoelectric crystal that converts electrical energy into mechanical vibrations or oscillations. The vibrations produced by the piezoelectric device can be transmitted to the casing 8 that in turn form acoustic waves in the casing 8. The acoustic waves impart energy to the tubular member to create a frequency response from the tubular and monitored by receiver transducers. The measured response collected can be analyzed real-time or stored as data for subsequent analysis. The data can be in analog or digital format.

BRIEF SUMMARY OF THE INVENTION

Disclosed herein is a method for evaluating a bond between a tubular and a bonding agent. The method involves measuring radial resonance modes of the tubular and comparing those measured values to a reference tubular. The comparison yields information relevant to the bond as well as if water is present adjacent the tubular.

A downhole tool is also disclosed herein that is equipped to provide the present method. The downhole tool is disposable within a tubular and comprises a transmitter and a receiver. The receiver is configured to receive a radial resonant frequency response induced within the tubular. The received response can be compared to the response of a reference tubular. The tool can further include an analyzer for conducting the comparison.

Also included herein is a method of evaluating a stuck tubular comprising measuring an induced frequency response within the tubular, comparing the measured frequency response to that of a reference tubular, and evaluating where the tubular is stuck based on the comparison.

DETAILED DESCRIPTION OF THE INVENTION

Figure 1:
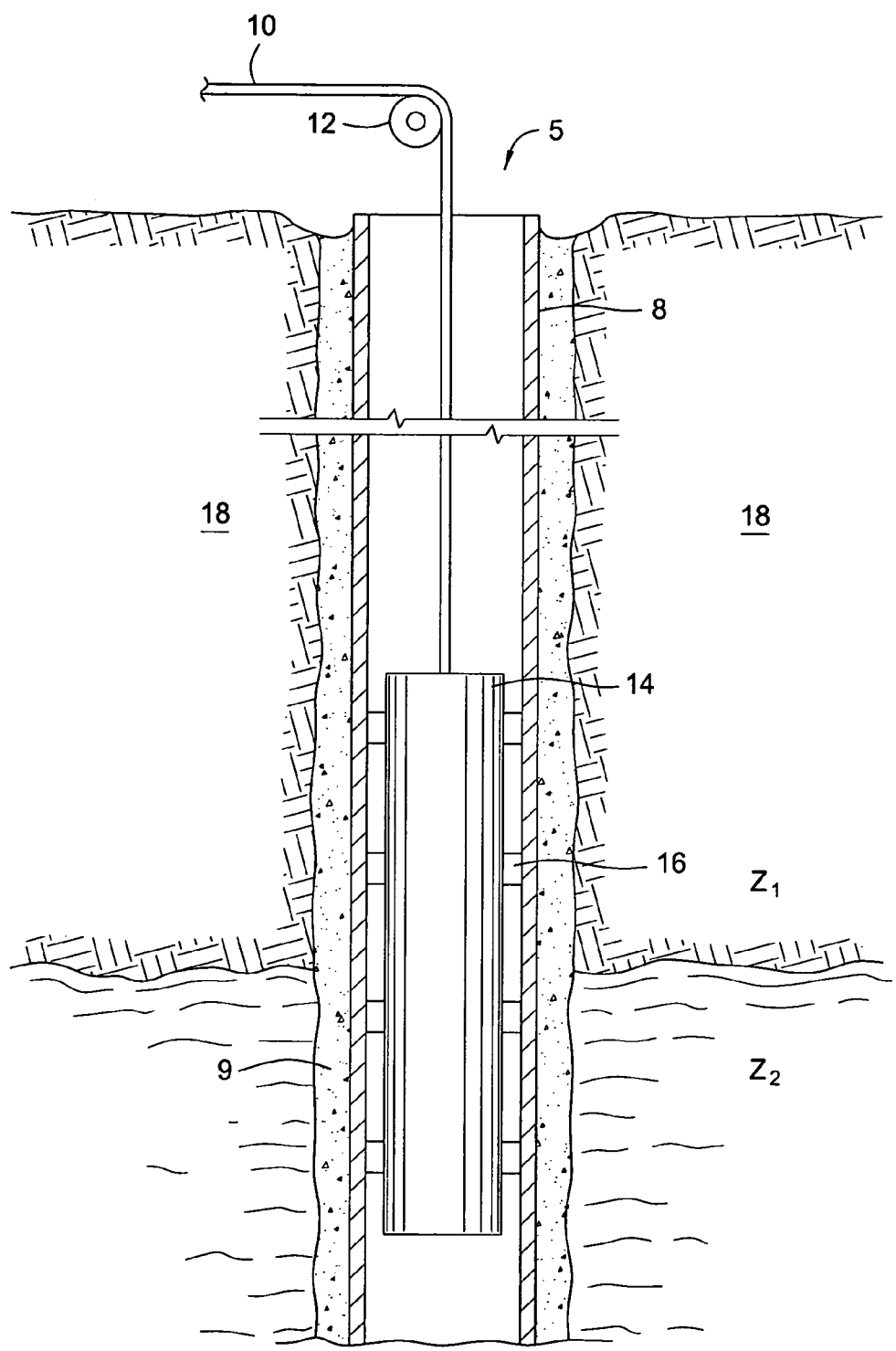
FIG. 1 illustrates a prior art cement bond evaluation device.

The frequency response within a tubular induced by an acoustic signal depends on many factors, such as the tubular dimensions, the presence of cement around the tubular, or the presence of fluid outside of the tubular instead of cement. Previously known methods utilize a reduction in the amplitude of acoustic waves or vibrations over time to evaluate the presence of fluid and cement but do not utilize the recorded frequency response of the acoustic signal in this evaluation. Test stands can be developed that simulate a properly bonded tubular as well as an improperly bonded one such as for example having water at the tubular's outer surface. The test stand data could provide corresponding frequency responses for comparison purposes. However, such a test stand is impractical for many situations, especially when dealing with cased holes that have been in existence for many years.

For the purposes of the discussion herein, a tubular can include, among other things, downhole casing, downhole tubing, a drill string, or any other substantially cylindrically shaped member. Also with regard to this disclosure, a bound tubular refers to the segment of a tubular cemented in place irrespective if some portions may lack proper bonding. Likewise, an unbound tubular referred to herein describes a section of tubular not bounded by cement. Generally, an unbound tubular will be in free space and surrounded only by air. In contrast "free pipe" refers to an unbonded portion of a tubular surround by a fluid, such as water.

In an embodiment of the method herein disclosed, a resonant response is produced within a tubular that is subsequently measured. The resonant response of the tubular can be determined by stimulating the tubular with a vibrational source then measuring the ensuing vibrations that are induced along the tubular. This can be performed graphically by studying the measured data in a plot of amplitude vs. frequency and identifying "spikes" in the measured response.

Moreover, the magnitude of the radial resonant response(s) of a tubular varies in accordance with changes in the material around or attached to the outer surface of the tubular. Accordingly, the present method provides the ability to assess these resonant value changes due to changes in material around the tubular and to identify the material attached to or around the tubular based upon the changes in resonant values.

The resonant response modes of an elongated tubular are approximately the same as the resonant response modes of a tubular section (such as a ring) comprised of the same material, where the section has substantially the same diameter and wall thickness as the elongated tubular. Thus by knowing the resonant modes of the ring, the resonant flexural modes of the corresponding elongated tubular can then be approximated. It should be pointed out that the unbound resonant modes of a tubular section can either be measured experimentally or calculated.

Resonant frequencies of a ring-like body can be modeled with the following relationship:

$$(\omega_n)^2 - (K_n)(\omega_n)^2 + Q_n = 0. \quad (1)$$

Parameters $K_n$ and $Q_n$ are defined as follows:

$$K_n = \{(n^2+1)/[(a^2)(\rho)(h)]\}\{(n^2)(D)/a^2)(E)(h)\}, \quad (2)$$

$$Q_n = [n^2(n^2-1)^2)(DEh)]/[a^2(\rho h)^2]. \quad (3)$$

Here n is the order of the mode, a is the ring radius, h is the thickness, $\rho$, E, D are the density, Young's modulus, and flexural rigidity defined as $D = Eh^2/(12(1-v^2))$, where $v$ is Poisson's ratio. Equations 1, 2, and 3 can be combined to create the following expressions for natural (resonant) frequency.

$$\omega_{fn} = [(K_n/2)(1-(1-4Q_n/K_n^2)^{1/2}]^{1/2} \quad (4)$$

$$\omega_{bn} = [(K_n/2)(1+(1-4Q_n/K_n^2)^{1/2}]^{1/2} \quad (5)$$

Equation 4 relates to the flexural or bending mode and equation 5 relates to the "breathing" mode.

Figure 2A:
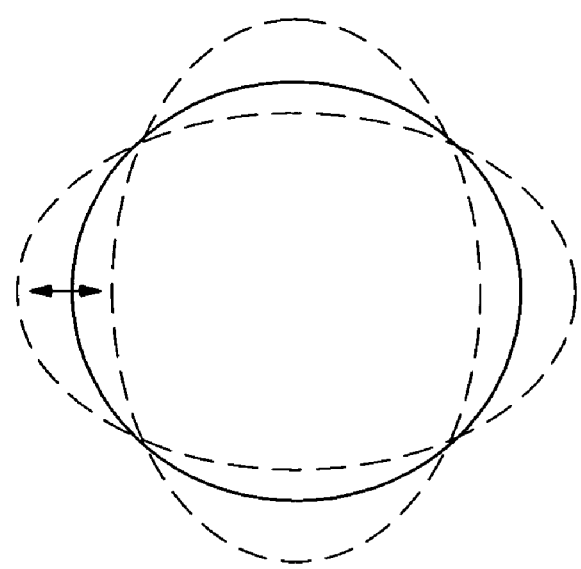
FIGS. 2a and 2b depict vibration modes for a circular ring.
Figure 2B:
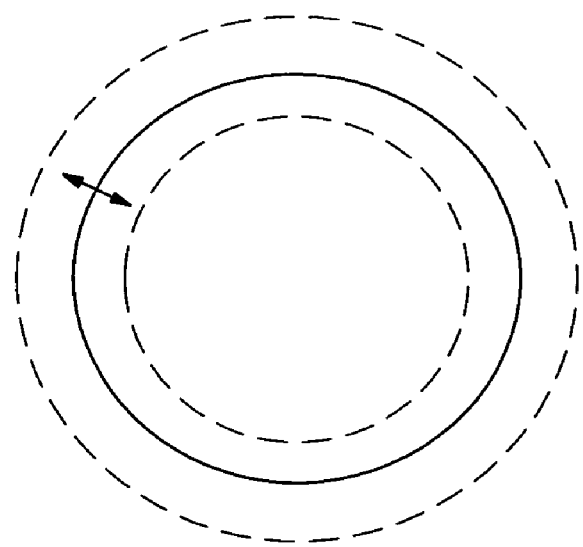

A graphical example of a ring resonating in a flexural mode is shown in FIG. 2a and in breathing mode in FIG. 2b—thus the resonant mode described herein can include both the flexural mode and the breathing mode. Further simplification of the frequency relationships reveals that the resonant frequency is roughly proportional to the square root of the Young's modulus of the material divided by its density. Those simplified relationships are shown in equations 6 and 7:

$$\omega_{fn} = ((E/\rho)^{1/2})G_{fn} \quad (6)$$

$$\omega_{bn} = ((E/\rho)^{1/2})G_{bn} \quad (7)$$

where $G_{fn}$ and $G_{bn}$ are the geometric factors given by the following relationships:

$$G_{fn} = \sqrt{A(1-\sqrt{1-B})}, \; G_{bn} = \sqrt{A(1+\sqrt{1-B})};$$

where A and B depend on ring radius a, ring thickness h, mode number n and Poisson's ratio $v$ in the following fashion:

$$A = \frac{n^2+1}{2}\left(1 + \frac{h^2}{a^2}\frac{n^2}{12(1-v^2)}\right)$$

$$B = 48a^2h^2\frac{n^2(n^2-1)^2(1-v^2)}{(n^2+1)^2(n^2h^2+12a^2(1-v^2))^2}$$

As such, the resonant frequency of an object having a ring or ring like cross sectional area should vary in relation to the stiffness and mass of the material attached to or surrounding the object. Since a tubular body has a ring-like cross sectional area, this phenomenon is applicable to tubulars as well.

Applying the relationship between resonant frequency and material stiffness and mass to the situation involving a casing bond, it has been deduced that the resonant frequency of a tubular within a wellbore varies depending on the efficacy of the bond and the cement properties (the steel properties should be known). Typically when a tubular, such as casing, is bonded within a wellbore, the outer surface of the tubular can be surrounded by cement (and thus most likely well bonded) or by a fluid such as water (and thus typically not well bonded). Microannuluses between the outer surface of the tubular and the cement can also be present.

Based on the physical properties of downhole fluids, such as water and most casing bonds, the above relationships reveal that a resonant frequency for a tubular segment bound by a casing bond (i.e. cement) would be greater than the resonant frequency of an unbound tubular not coupled by a liquid. Similarly, the resonant frequency of a tubular segment surrounded by a liquid (such as water) would have a magnitude less than that of the resonant frequency of an unbound tubular. This deduction was verified with the following non-limiting example of use of an embodiment of the method herein described.

Optionally the response tubular section can be obtained empirically by physically measuring the frequency response of a tubular. The measurement can be of substantially all the particular tubular, or a section thereof. When measuring an entire tubular within a wellbore it is assumed that some portion is not properly bonded, thus by analyzing the measured response, the unbonded or poorly bonded sections can be identified. Alternatively, a section of the tubular, wherein the bonding condition is known, can be measured. These methods can be used to obtain an empirical reference for the resonant frequency.

EXAMPLE

Figure 3:
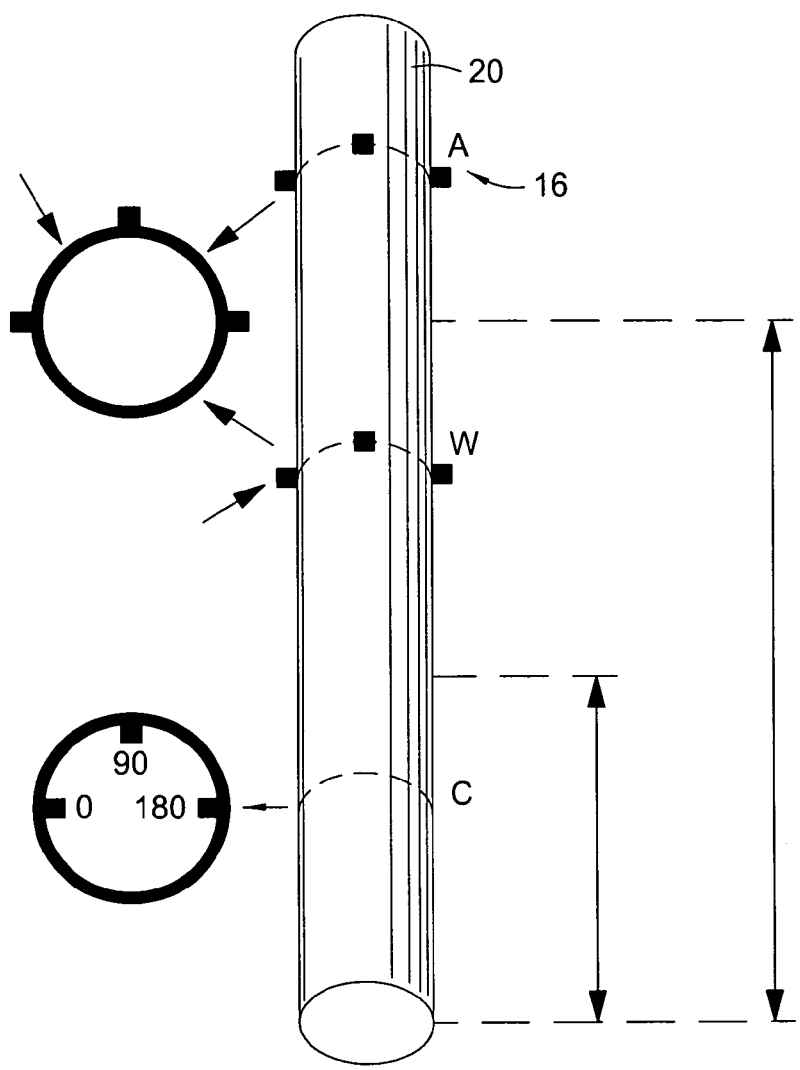
FIG. 3 shows an embodiment of a tubular test set up.
Figure 4:
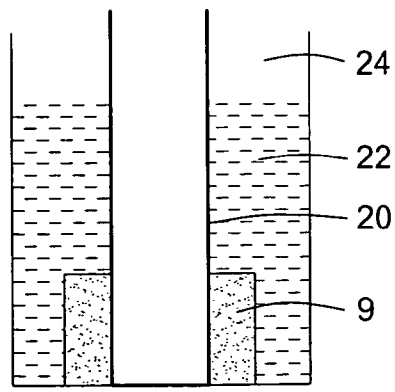
FIG. 4 is a cross sectional view of a tubular test set up.

A test set up was prepared for evaluating the resonant modes of a tubular exposed to different surroundings. The test set-up comprised a tubular 20 having a 36 inch long steel pipe with a 5½ inch diameter and a 7/16 inch thickness. The test also included a one-inch long calibrating ring cut from the same pipe. As shown in the embodiment of FIG. 3, the tubular 20 was fitted with nine sensors or transducers 16 glued to the outer surface of the tubular 20. The sensors used in the experiment were ceramic piezoelectric transducers. Three sensors were allocated for each of the three sections of the tubular 20. The set of sensors having the "C" designation were in the cemented section, the sensors having the "W" designation were in the section of the tubular 20 disposed in water, and the sensors having the "A" designation were in the section of the tubular 20 exposed to air. The sensors were positioned at 90° intervals around the tubular 20. FIG. 4 illustrates a cross sectional view of the test set up. As shown, a portion of the tubular 20 is secured with cement 9. Water 22 extends above the cemented portion and the outer circumference of the tubular is exposed to air 24 above the water level.

Figure 5:
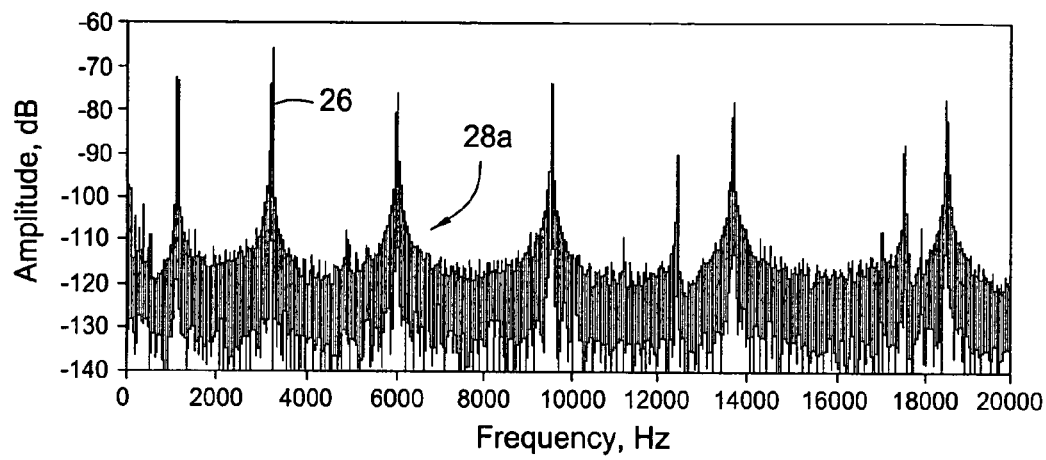
FIG. 5 is a plot of a frequency response.
Figure 6:
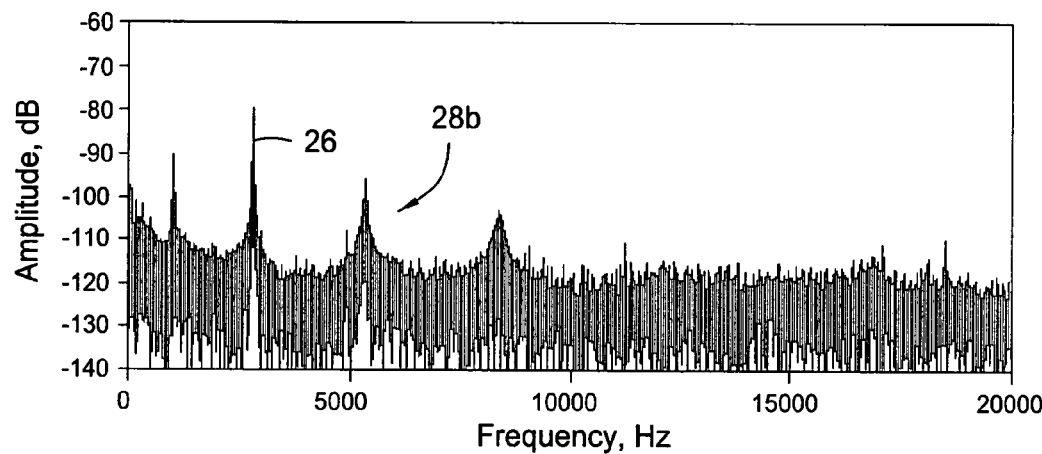
FIG. 6 is a plot of a frequency response.

The measured frequency responses (impact excitation) of the ring in air and water are shown in FIGS. 5 and 6, respectively. The measured resonant frequencies occur at the spikes 26 as shown on the respective plots (28a and 28b). Table 1 compares the measured resonance frequencies of the ring in air and water and the calculated resonance frequencies of the ring in air. This allows for clear identification of the observed resonance values with respective vibration modes. The figures and the table data also show that the added mass of the water shifts the frequency downward.

TABLE 1

| Calculated (air) frequencies, Hz | 1063 | 3006 | 5763 | 9320 |
| --- | --- | --- | --- | --- |
| Measured (air) frequencies, Hz | 1130 | 3171 | 5980 | 9530 |
| Measured (water) frequencies, Hz | 1005 | 2790 | 5285 | 8355 |

Figure 7:
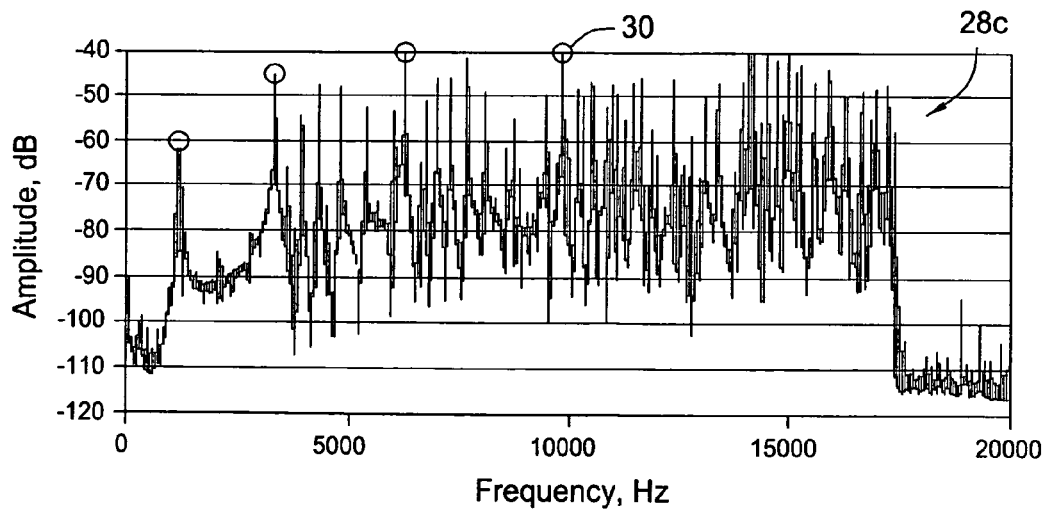
FIG. 7 is a plot of a frequency response.

FIG. 7 illustrates the frequency response of the tubular 20 using the attached sensors secured within the cemented portion of the tubular 20. The sensor producing the signal was situated at 180°, while the sensor receiving the frequency response was located at 0°. While the plot 28c contains many frequency responses, many of which represent the resonant frequencies of the tubular 20 in the longitudinal direction, the resonance responses were easily identified and marked by the circles 30.

It should be pointed out that the pipe resonance frequency values are greater than those of the ring cut from that pipe. Table 2 contains resonance frequencies of the ring and pipe in air. This value difference is expected and in agreement with the theory since a longer pipe adds additional radial stiffness as compared to a ring whose length is nominal.

TABLE 2

| Measured (air) ring frequencies, Hz | 1130 | 3171 | 5980 | 9530 |
| --- | --- | --- | --- | --- |
| Measured (air) pipe frequencies, Hz | 1190 | 3300 | 6202 | 9835 |

The measurements also show that when cement is bonded to pipe, the corresponding damping is increased. The damping could be best described using the Damping Ratio, $\eta=\frac{1}{2}Q$, where Q is the Quality Factor of the resonance. Q-factor is defined by the formula: $Q=F_R/\Delta F_{-3dB}$, where $F_R$ is the resonance frequency and $\Delta F_{-3dB}$ is the frequency width of the resonance peak measured at −3 dB level from the top of the peak. The Q-factor is distinct from the $Q_n$ value of equations (1)-(5) above. Table 3 shows the resonant frequencies ($F_R$) and damping ratios ($\eta$) for all three sections of the pipe coupled by air, water, and cement. These values were measured five days after cementing the pipe.

TABLE 3

| | Section Coupling | | |
| --- | --- | --- | --- |
| | Air—Air | Water—Water | Cement-Water |
| Resonance Frequency, Fr, Hz | 1192 | 964 | 1736 |
| Damping Ratio η | 0.009 | 0.010 | 0.055 |

The results of the above described experiments verify that water adds mass (inertia) to a tubular thereby reducing the resulting resonance frequency (964 Hz in water vs. 1192 Hz in air). In contrast, a cement bond stiffens a tubular that in turn increases the resulting resonance frequency modes (i.e. 1736 Hz cemented vs. 1192 Hz in air). Thus by comparing the measured frequency modes of a tubular 20 disposed within a wellbore 5 to the frequency modes (either measured or calculated) of a ring whose diameter and thickness is substantially the same as the tubular, the presence or quality of a cement bond around the tubular 20 can be evaluated. This can be especially useful when dealing when a casing or tubing has been in place for some time and ring samples of the originally placed tubular 20 are not available. A ring of substantially the same diameter, thickness, and material as that of the tubular can be fabricated and tested thereby establishing benchmark data for comparison purposes. Optionally, these values of resonance for the reference tubular can be obtained mathematically using the above listed relationships.

Thus the bond between a tubular and a bonding agent can be evaluated by comparing the measured resonant frequency of the tubular to the resonant frequency of a reference tubular. For the purposes of discussion herein, the bonding agent refers to substances applied between a downhole tubular and a wellbore, and includes anything used to bond the tubular within the wellbore and/or to provide isolation along the tubular. The reference tubular includes tubulars bound by a bonding agent, unbound tubulars, as well as free pipe tubulars. Knowing the reference tubular state (i.e. bound, unbound, or free) and its corresponding resonant frequency, the frequency of the measured tubular can be compared to that of the reference tubular to evaluate the measured tubular bond. The above described procedure can be used for determining mechanical properties of the bonding agent. Such mechanical properties include density, Young's modulus, compressibility, Poisson's ratio, and velocity of the agent.

Figure 8:
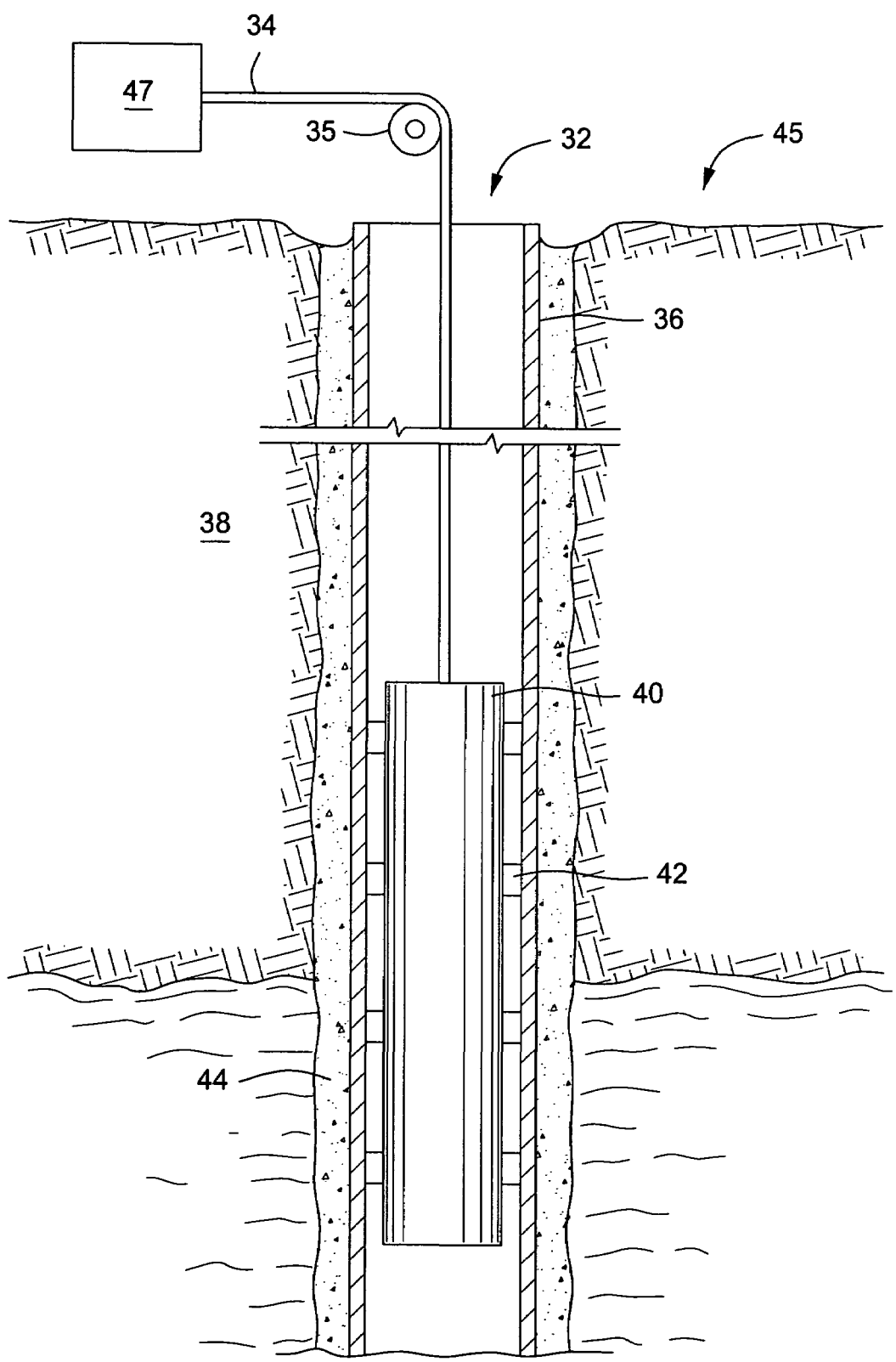
FIG. 8 illustrates in side view an embodiment of a downhole tool within a wellbore.

FIG. 8 illustrates a downhole tool 40 useful in evaluating a bond between a tubular and a bonding agent. In FIG. 8, the tubular is a downhole casing 36 disposed in a wellbore 32 that pierces a subterranean formation 38. The bonding agent comprises cement 44 for isolating zones within the formation 38 and for bonding the casing 36 to the wellbore 32. The downhole tool 40 is suspended within the wellbore 32 on a wireline 34, where the wireline 34 is optionally supported on a surface pulley 35. The wireline 34 not only can provide a way of lowering, supporting, and raising the downhole tool 40 into, in, and out of the wellbore 32, it can provide a communication link between the tool 40 and the surface 45. Optionally, an information handling system (IHS) 47 can be linked to the downhole tool 40 via the wireline 34.

In the embodiment of the downhole tool 40 of FIG. 8, transducers 42 are shown disposed on the downhole tool 40. The transducers 42 can comprise a mix of transmitters, receivers, or one or more of the transducers may provide both transmitting and receiving functions. The transmitters may include a piezoelectric device, an electro-magnetic acoustic transducer (EMAT), a wedge transducer, a pulsed laser, and a flexural resonator, or combinations thereof. By virtue of the included transducers 42, the downhole tool 40 is equipped to transmit a signal, such as an acoustic wave, into the casing 36 and thereby induce an acoustic signal therein. The included receivers enable the tool 40 to record the resulting induced signal propagating along the casing 36. Moreover, the transmitters are tuned to emit a signal designed to induce a resonant frequency response in the casing 36 that is detected by a receiver. As such, the downhole tool 40 is equipped to measure an induced frequency response of the casing 36, including a radial resonant frequency response.

In one embodiment of operation, the downhole tool 40 travels through the casing 36 (upwardly or downwardly) while inducing an acoustic signal into the casing 36 with its transmitters and recording the induced frequency response(s) with the receivers. The recorded response(s) can be analyzed in accordance with the method of signal analysis as described above, i.e. compared to the resonance of a reference tubular to evaluate the tubular bond.

The recorded signal(s) may be stored within the downhole tool 40 for subsequent analysis or can be transmitted to the surface, such as via wireline 34, for realtime analysis. The analysis considered includes the steps and methods described above, including the steps and methods that comprise receiving the measured frequency response, compared the measured frequency response to that of a reference tubular, and evaluating a bond based on the comparison. An analyzer may be employed that is specifically configured to perform these analysis steps used in conjunction with the recorded acoustic signals and responses. The analyzer may be disposed with the downhole tool 40 or otherwise disposable within a wellbore 32. Optionally, the analyzer may be located at the surface, either a part of or the entire analyzing system, with the remaining portion downhole or at a remote location.

As shown in FIG. 8, an IHS may be coupled to the downhole tool 40 via the wire line 34. The IHS 47 may be employed for controlling the generation of the acoustic signal herein described and/or receiving the subsequent recording of the signal(s). Moreover, the IHS may also be used to store recorded data as well as processing the data into a readable format. The IHS 47 may be disposed at the surface, in the wellbore, or partially above and below the surface. The IHS 47 may include a processor, memory accessible by the processor, nonvolatile storage area accessible by the processor, and logic algorithms for performing each of the steps above described.

Figure 9:
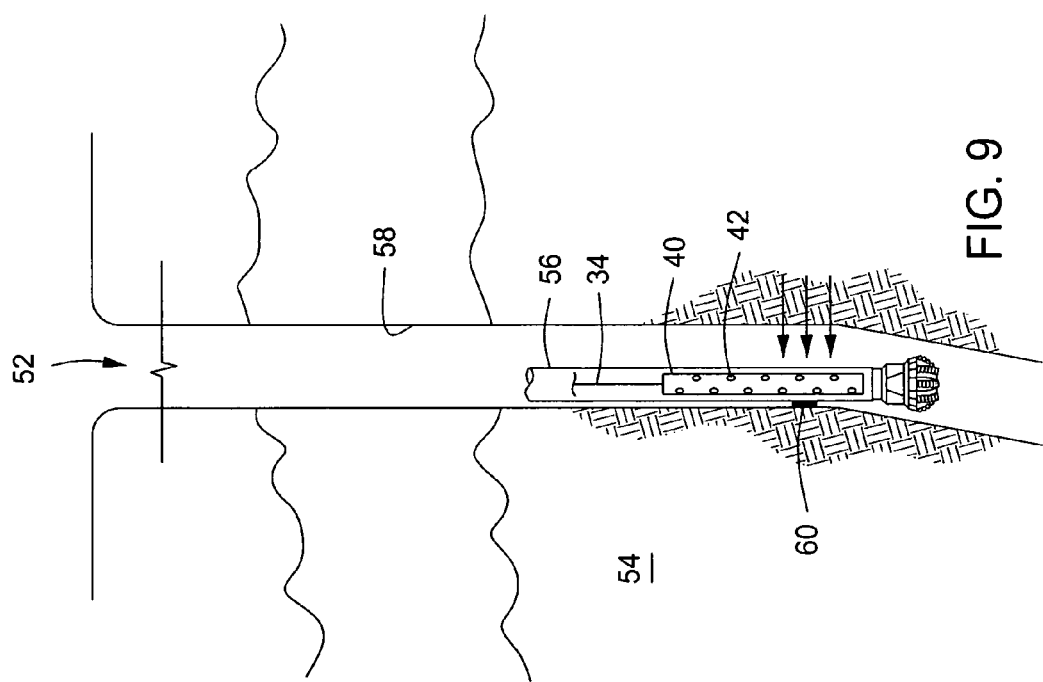
FIG. 9 depicts in side view a stuck portion of drill string with a downhole tool therein.

FIG. 9 depicts an embodiment of the method disclosed herein where the tubular comprises a drill string 56. As shown, the drill string 56 has become adhered to mudcake 60 that lines the wall 58 of the wellbore 52. Typically a drill string may become lodged against the wellbore wall 58 due to differential pressure (represented by arrows) between the wellbore 52 and the surrounding formation 54. This differential pressure, also referred to as an overbalanced condition, is created by adding high density fluids to the wellbore 52 until the wellbore pressure exceeds the formation pressure, the differential pressure can create fluid migration from the wellbore 52 into the formation 54. One ramification of this condition is that if a drill string passes too close to the wellbore wall 58, the fluid migration may wedge the drill string 56 against the wellbore wall 58 resulting in what is known as a "stuck pipe" situation.

While a stuck drill string 56 can be unstuck by applying a shock or vibration to the string 56 or by applying a pull from the surface significantly greater than weight of the unstuck pipe, in some instances pipe recovery may require either severing the string 56. In either recovery method, it is necessary to determine what portion(s) of the drill string 56 is stuck in order to facilitate proper removal. Forceful contact between the wellbore wall and the outer surface of the drill string 56 can be discerned by the same method used to ascertain the bond between a tubular and a bonding agent. Exciting the tubular (drill string) at discrete locations along its length with an applied signal to generate a resonant response, measuring the responding resonant response, and comparing the measured response with a reference tubular can reveal what portion of the tubular is contacting the wellbore wall. Knowing where the drill string is adhering to the wellbore wall typically reflects the stuck pipe location/depth. Additionally, the present method includes the capability of discerning the azimuthal location of where the mudcake contacts the drill string in addition to the depth.

FIG. 9 further provides an example of how the downhole tool 40 equipped with transducers 42 can be inserted within the stuck drill string 56. The transducers 42 on the downhole tool 40 can emit a signal configured to induce the resonant radial frequency response of the tubular wall (drill string) and can also record the resulting signal.

Figure 10:
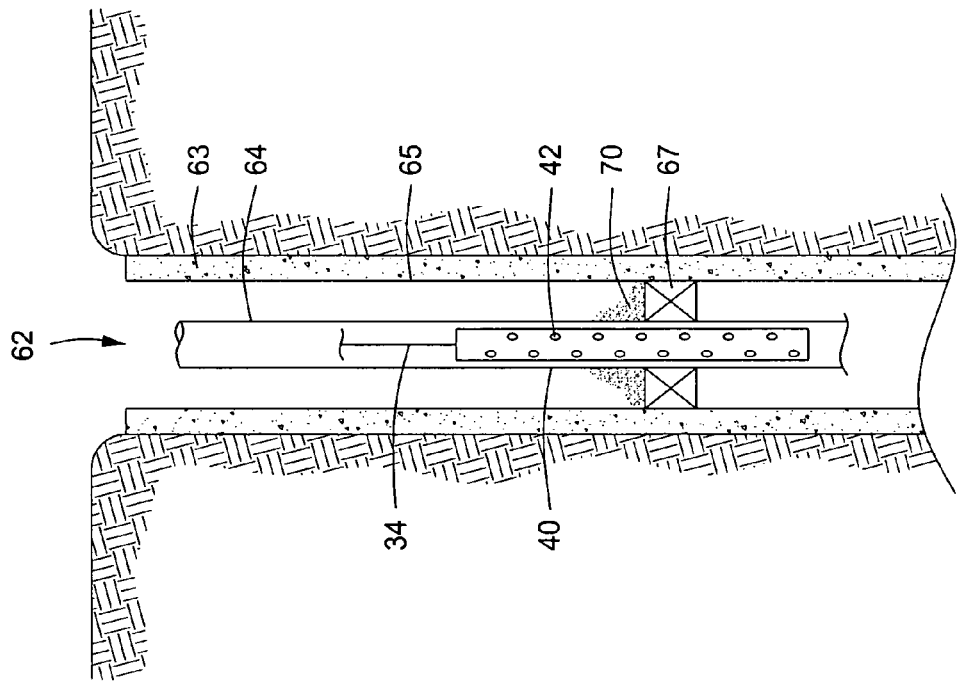
FIG. 10 portrays in partial cutaway side view a portion of stuck tubing with a downhole tool therein.

FIG. 10 illustrates a section of tubing 64 set in a cased hole 62 where the cased hole comprises casing 63 secured within the cased hole 62 with cement 65. A packer 67 is shown anchoring the tubing 64 to casing 63. Detritus 70 or other debris can accumulate in the hole adjacent tubing 64 on top of the packer 67. Over time a sufficient amount of detritus 70 may be present to wedge the tubing within the casing 63 thereby preventing removal of the tubing 64. The method of removing stuck tubing hinges on how and where the tubing is stuck. As with the bonding agent and the mudcake, detritus 70 surrounding the tubing 64 can be detected by the downhole tool 40. Thus by lowering the downhole tool 40 within the tubing 64, measuring the radial resonant frequency, and comparing the resonant frequency to a reference frequency, an evaluation can be made whether or not the tubing adjacent the packer 67 is surrounded by detritus 70.

The present method described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, the resonant frequency of the reference tubular can be obtained experimentally such as by a measurement, or this value can be calculated such as by the above cited relationships. These and other similar modifications will readily suggest themselves to those skilled in the art, and are intended to be encompassed within the spirit of the present invention disclosed herein and the scope of the appended claims.

What is claimed is:

1. A method of evaluating a bond on a downhole tubular comprising:
   emitting a signal into the tubular configured to induce a radial resonant frequency response;
   measuring the radial resonant frequency response induced within the downhole tubular;
   obtaining at least one of a bonded and an unbonded radial resonant frequency response of a reference tubular having approximately the same resonant frequency response of the downhole tubular;
   comparing the measured frequency response of the downhole tubular to the at least one of a bonded and unbonded radial resonant frequency response of the reference tubular; and
   determining the downhole tubular is bonded if its measured radial resonant frequency response is approximately the same as the bonded radial resonant frequency response of the reference tubular or determining the downhole tubular is not bonded if its measured radial resonant frequency response is approximately the same as the unbonded radial resonant frequency response of the reference tubular.

2. The method of claim 1, wherein the unbonded radial resonant frequency response of the reference tubular is taken when the reference tubular is surrounded by a substance selected from the list consisting of air and water.

3. The method of claim 2 wherein the characteristics of the bonding agent are known.

4. The method of claim 1, wherein the reference tubular is unbound.

5. The method of claim 1 wherein the step of evaluating the bond comprises determining the presence of fluid in the region surrounding the tubular.

6. The method of claim 1, wherein the step of obtaining the radial resonant frequency response of the reference tubular is performed through a calculation.

7. The method of claim 1, wherein the step of obtaining the radial resonant frequency response of the reference tubular is performed empirically.

8. The method of claim 1, wherein the reference tubular is a ring of substantially the same diameter, thickness, and material as the downhole tubular.

* * * * *